(12) United States Patent
Siragusa

(10) Patent No.: US 8,672,178 B2
(45) Date of Patent: Mar. 18, 2014

(54) HOLE PLUG ASSEMBLY

(75) Inventor: George Siragusa, Chicago Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/636,189

(22) PCT Filed: Apr. 14, 2011

(86) PCT No.: PCT/US2011/032394
§ 371 (c)(1),
(2), (4) Date: Sep. 20, 2012

(87) PCT Pub. No.: WO2011/133374
PCT Pub. Date: Oct. 27, 2011

(65) Prior Publication Data
US 2013/0014444 A1    Jan. 17, 2013

Related U.S. Application Data

(60) Provisional application No. 61/325,979, filed on Apr. 20, 2010.

(51) Int. Cl.
*F16B 13/14* (2006.01)

(52) U.S. Cl.
USPC ........................................... 220/789

(58) Field of Classification Search
USPC ............ 49/463; 220/792, 789, 787, 784, 802, 220/804, 801, 281, 284, 260; 24/458; 16/2.1–2.5
See application file for complete search history.

(56) References Cited

U.S. PATENT DOCUMENTS

| | | | | |
|---|---|---|---|---|
| 2,552,917 | A * | 5/1951 | Becker | 220/787 |
| 3,021,975 | A * | 2/1962 | Sarafinas | 220/789 |
| 3,332,572 | A * | 7/1967 | Green | 220/789 |
| 3,851,794 | A * | 12/1974 | Hehl | 220/789 |
| 4,143,432 | A * | 3/1979 | Deken | 4/295 |
| RE30,326 | E * | 7/1980 | van Buren, Jr. | 220/326 |
| 4,290,536 | A * | 9/1981 | Morel | 220/789 |
| 4,301,629 | A * | 11/1981 | Farr | 52/99 |
| 4,334,632 | A * | 6/1982 | Watanabe | 220/787 |
| 4,363,420 | A * | 12/1982 | Andrews | 220/787 |
| 4,399,927 | A * | 8/1983 | Yaotani et al. | 220/789 |
| 4,534,088 | A * | 8/1985 | Ricke | 24/295 |

(Continued)

FOREIGN PATENT DOCUMENTS

| | | |
|---|---|---|
| EP | 1757848 A1 | 2/2007 |
| WO | 01/00477 A1 | 1/2001 |

OTHER PUBLICATIONS

An International Search Report and Written Opinion, dated Jul. 15, 2011, in International Application No. PCT/US2011/032394.

*Primary Examiner* — Katherine Mitchell
*Assistant Examiner* — Justin Rephann
(74) *Attorney, Agent, or Firm* — Mark W. Croll; Paul F. Donovan

(57) ABSTRACT

A hole plug assembly includes a covering base connected to a first lip, at least one extensible member having a first portion connected to one or both of the covering base or the first lip, and a second lip connected to a second portion of the at least one extensible member. The at least one extensible member is configured to expand and contract with respect to a central axis of the covering base.

15 Claims, 3 Drawing Sheets

(56) References Cited

U.S. PATENT DOCUMENTS

| | | | |
|---|---|---|---|
| 4,588,104 A | 5/1986 | Danico | |
| 4,588,105 A * | 5/1986 | Schmitz et al. | 220/787 |
| 4,646,932 A * | 3/1987 | Masler | 220/789 |
| 4,760,935 A * | 8/1988 | van den Beld et al. | 220/789 |
| 4,761,319 A * | 8/1988 | Kraus et al. | 428/99 |
| 4,801,040 A * | 1/1989 | Kraus | 220/787 |
| 4,938,378 A * | 7/1990 | Kraus | 220/789 |
| 4,998,642 A * | 3/1991 | Kraus | 220/782 |
| 5,071,022 A * | 12/1991 | Sick | 220/789 |
| 5,267,667 A * | 12/1993 | Cozzani | 220/787 |
| 5,353,472 A * | 10/1994 | Benda et al. | 16/2.2 |
| 5,505,324 A | 4/1996 | Danico | |
| 5,659,924 A * | 8/1997 | Gildersleeve | 16/2.1 |
| 5,702,133 A * | 12/1997 | Pavur et al. | 292/80 |
| 5,749,491 A * | 5/1998 | Wylder et al. | 220/719 |
| 6,119,305 A * | 9/2000 | Loveall et al. | 16/2.2 |
| 6,290,279 B1 | 9/2001 | Haight et al. | |
| 6,296,136 B1 * | 10/2001 | Huet | 220/233 |
| 6,319,436 B1 * | 11/2001 | Jaeger et al. | 264/40.6 |
| 6,557,208 B2 * | 5/2003 | Huet | 16/2.1 |
| 6,691,468 B2 * | 2/2004 | Helferty | 49/463 |
| 6,708,979 B2 * | 3/2004 | Stratman et al. | 277/316 |
| 7,108,269 B2 * | 9/2006 | Benkel et al. | 277/606 |
| RE39,654 E * | 5/2007 | Huet | 16/2.1 |
| 7,347,655 B2 * | 3/2008 | Nagasawa et al. | 411/508 |
| 7,537,132 B2 * | 5/2009 | Marple et al. | 220/254.7 |
| 7,578,413 B2 * | 8/2009 | Kraus | 220/789 |
| 7,997,437 B2 * | 8/2011 | Jatzke et al. | 220/359.4 |
| 8,070,008 B2 * | 12/2011 | Janke | 220/233 |
| 8,162,166 B2 * | 4/2012 | Nakazato | 220/359.4 |
| 8,371,789 B2 * | 2/2013 | Takita | 411/508 |
| 2005/0000973 A1 * | 1/2005 | Sbongk | 220/802 |
| 2005/0269330 A1 * | 12/2005 | Baughman | 220/288 |
| 2006/0091144 A1 * | 5/2006 | Siragusa | 220/789 |
| 2006/0186130 A1 * | 8/2006 | Jatzke et al. | 220/789 |
| 2006/0278653 A1 * | 12/2006 | Zeyfang et al. | 220/801 |
| 2007/0062962 A1 | 3/2007 | Iwahara | |
| 2011/0005141 A1 * | 1/2011 | Leverger et al. | 49/463 |
| 2012/0193359 A1 * | 8/2012 | Mai | 220/233 |

* cited by examiner

HOLE PLUG ASSEMBLY

RELATED APPLICATIONS

This application relates to International Application No. PCT/US2011/032394, filed Apr. 14, 2011 and claims priority benefits from U.S. Provisional Patent Application No. 61/325,979 entitled "Hole Plug," filed Apr. 20, 2010, which is hereby incorporated by reference in its entirety.

FIELD OF EMBODIMENTS OF THE INVENTION

Embodiments of the present invention generally relate to devices configured to plug holes within panels, and, more particularly, to hole plug assemblies having a double-lip design.

BACKGROUND

Various devices and components include panels and the like having holes formed therein. During an assembly process, the holes may receive and retain fasteners, or allow tubing, wiring, or the like to pass therethrough. In some instances, however, a hole may not be utilized. Similarly, the hole may be reserved for a future application, for example. Hole plugs are used to securely cover and close holes formed within panels of a device.

FIG. 1 illustrates an isometric top view of a conventional hole plug 10. The hole plug 10 is typically formed of a resilient material, such as rubber, that allows the hole plug 10 to flex, while at the same time providing a fluid-tight barrier.

The hole plug 10 includes a main body 12. The main body 12 includes a central covering base 14 configured to cover a hole. The base 14 is integrally formed with an arcuate, bell-shaped upper lip 16 that extends upwardly from outer edges of the base 14 and circumferentially extends around the base 14.

FIG. 2 illustrates an axial cross-sectional view of the conventional hole plug 10 secured to a panel 18. A hole is formed through the panel 18.

The hole plug 10 also includes a lower lip 20 that radially extends from the base 14 underneath the upper lip 16. The lower lip 20 also circumferentially extends around the base 14. As shown in FIG. 2, the edges 22 of the panel 18 that define the hole are pinched between the upper lip 16 and the lower lip 20. As such, the hole plug 10 is secured to the panel 10 within the hole.

The upper and lower lips 16 and 20, respectively, are flexible and configured to allow the base 14 to be inserted into the hole. During this insertion process, the upper and lower lips 16 and 20, respectively, snap into a securing relationship with respect to the edges 22 of the panel 18.

FIG. 3 illustrates an axial cross-sectional view of the conventional hole plug 10 secured to a panel 18'. The panel 18' is thicker than the panel 18. In order to accommodate the panel 18', the gap between the lips 16 and 20 in the secured position is wider than that shown in FIG. 2. As such, the top lip 16 flattens. As can be appreciated, with increased panel thickness, the hole plug 10 may be unable to be used.

In particular, as panel thickness is increased, the vestige v (that is, the portion of the upper lip 16 above a top surface of the panel 18') decreases. The decrease in the vestige v occurs because the upper lip 16 opens wider to accommodate the thicker panel 18', and therefore tends to flatten. At some point, panel thickness causes the top lip 16 to completely flatten against the panel 18' such that it is unable to accommodate a thicker panel. An exemplary range of panel thickness that may be accommodated by a typical hole plug, such as the hole plug 10, is on the order of 2 mm.

In order to accommodate thicker panels, therefore, the height of the upper lip 16 may be increased so that the vestige v is increased. However, for various applications, the increased height of the upper lip may prove to be visually and functionally unacceptable. Additionally, it has been found that an increased height of the upper lip may adversely affect the retaining ability of the hole plug.

SUMMARY OF EMBODIMENTS OF THE INVENTION

Certain embodiments of the present invention provide a hole plug assembly that includes a covering base connected to a first lip, at least one extensible member having a first portion connected to one or both of the covering base or the first lip, and a second lip connected to a second portion of the at least one extensible member. The at least one extensible member is configured to expand and contract with respect to a central axis of the covering base.

The first lip and the second lip are configured to securely fasten to an edge of a panel defining a hole within the panel. The at least one extensible member is configured to allow the first and second lips to securely fasten to panels of increased thicknesses.

The at least one extensible member may include a bellows. The at least one extensible member may include a first extensible member connected to one or both of the covering base or the first lip, and a second extensible member connected to the first extensible member. For example, the at least one extensible member may include multiple bellows.

The covering base, the first lip, the at least one extensible member, and the second lip may be integrally formed together. Further, the hole plug assembly may be formed of an elastomeric material.

Figure 1:
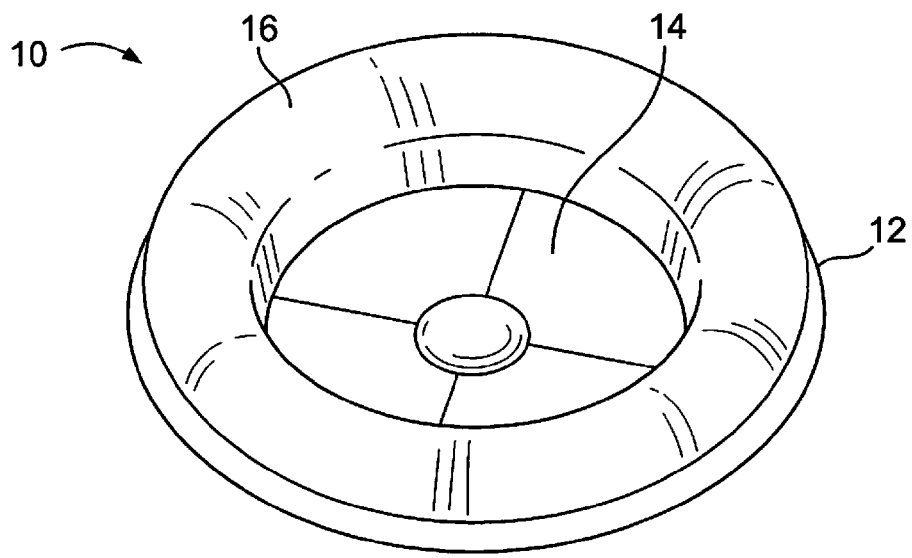
FIG. 1 illustrates an isometric top view of a conventional hole plug.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 4:
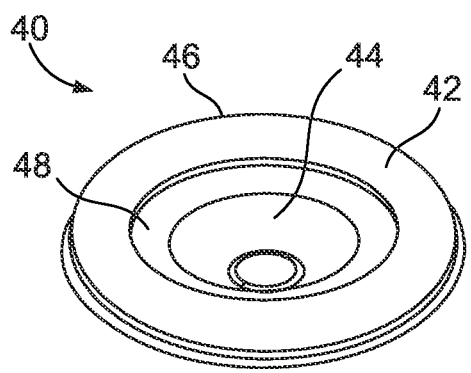
FIG. 4 illustrates an isometric top view of a hole plug assembly, according to an embodiment of the present invention.
Figure 5:
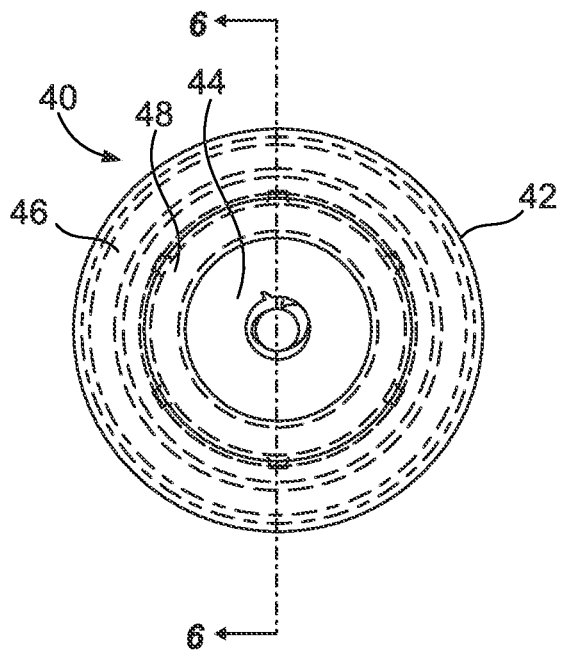
FIG. 5 illustrates a top plan view of a hole plug assembly, according to an embodiment of the present invention.

FIG. 4 illustrates an isometric top view of a hole plug assembly 40, according to an embodiment of the present invention. FIG. 5 illustrates a top plan view of the hole plug assembly 40. Referring to FIGS. 4 and 5, the assembly 40 includes a main body 42 having a central base 44 connected to an upper lip 46 through a circumferential extensible portion or bellows 48. The hole plug assembly 40 is configured to be secured within a hole formed in a panel.

Figure 6:
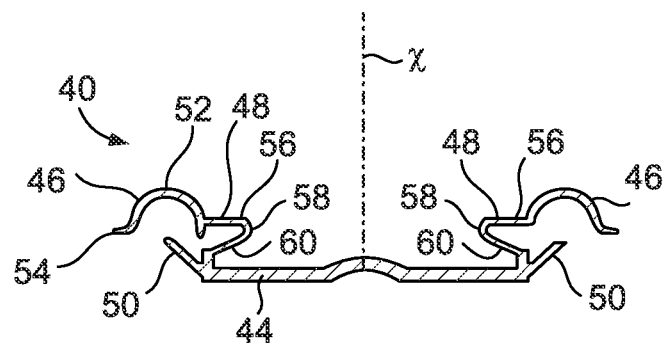
FIG. 6 illustrates an axial cross-sectional view of a hole plug assembly through line 6-6 of FIG. 5, according to an embodiment of the present invention.

FIG. 6 illustrates an axial cross-sectional view of the hole plug assembly 40 through line 6-6 of FIG. 5. A lower lip 50 radially extends from the base 44 underneath the upper lip 46. Similar to the upper lip 46, the lower lip 50 extends circumferentially around the base 44.

The upper lip 46 includes an arcuate bulge 52 that connects to a terminal flange 54. The flange 54 and the lower lip 50 are configured to compressively sandwich an edge of a panel therebetween.

An end of the bulge 52 opposite the flange 54 connects to the bellows 48. The bellows 48 includes a flexible ledge 56 that is directed inwardly toward the central axis x of the assembly 40. The ledge 56, in turn, integrally connects to a curved intermediate portion 58 which, in turn, integrally connects to a flap 60 that connects to the base 44 and/or proximate the union of the lower lip 50 and the base 44. The assembly 40 may include additional bellows 48. For example, an upper bellows may integrally connect to a lower bellows that integrally connects to the base 44. The additional bellows allow for increased extension between the upper and lower lips 46 and 50, respectively.

The assembly 40 may be integrally formed from a single piece of resilient material, such as an elastomeric material that allows the assembly 40 to flex. Alternatively, the bellows 48, for example, may be formed of a separate piece of flexible material that is secured to the upper lip 46 and base 44 through bonding or the like.

Figure 2:
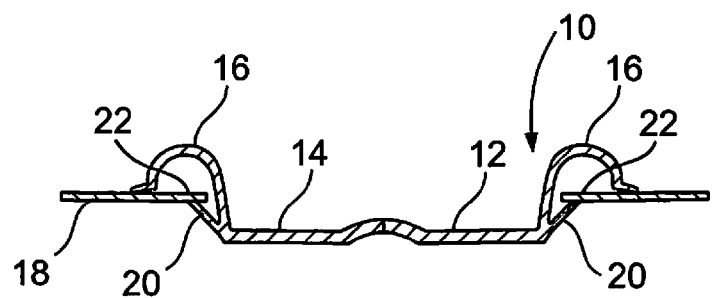
FIG. 2 illustrates an axial cross-sectional view of a conventional hole plug secured to a first panel.
Figure 3:
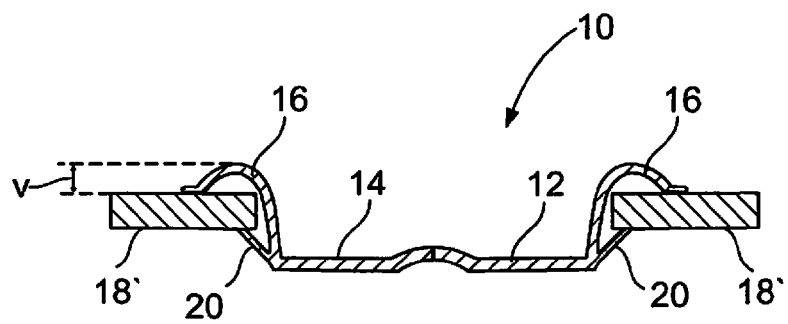
FIG. 3 illustrates an axial cross-sectional view of a conventional hole plug secured to a second panel.

In operation, the circumferential bellows 48 allows the upper lip 46 to separate from the lower lip 50 over a greater distance, as compared to the conventional hole plug 10, which is shown and described with respect to FIGS. 1-3.

Figure 7:
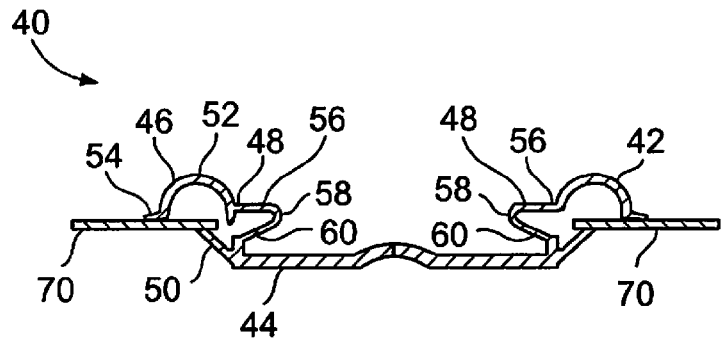
FIG. 7 illustrates an axial cross-sectional view of a hole plug assembly secured to a first panel, according to an embodiment of the present invention.

FIG. 7 illustrates an axial cross-sectional view of a hole plug assembly 40 secured to a first panel 70, according to an embodiment of the present invention. The flange 54 of the upper lip 46 and the lower lip 50 securely retain edges of the panel 70 that define a hole within the panel 70. Because the assembly 40 is formed of a flexible material, the upper and lower lips 46 and 50, respectively, are able to flexibly snap into position.

As shown, the panel 70 is thin enough that the bellows 48 does not greatly expand. Instead, the ledge 56 remains substantially parallel with the base 44.

Figure 8:
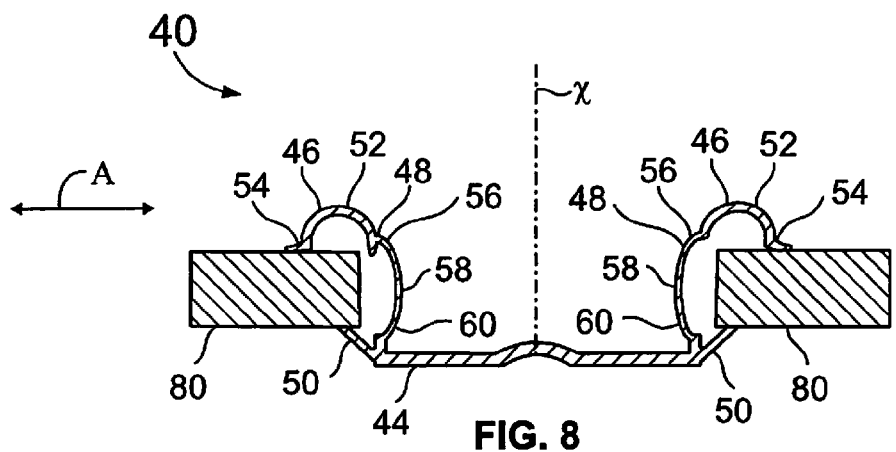
FIG. 8 illustrates an axial cross-sectional view of a hole plug assembly secured to a second panel, according to an embodiment of the present invention.

FIG. 8 illustrates an axial cross-sectional view of the hole plug assembly 40 secured to a second panel 80, according to an embodiment of the present invention. Because the panel 80 is substantially thicker than the panel 70 (shown in FIG. 7), the bellows 48 expands and flattens with respect to the central axis x of the assembly 40. That is, instead of the bulges 52 of the upper lip 46 flattening with respect to arrows A, the bellows 48 flattens over directions that are parallel to the central axis x of the assembly 40.

Therefore, instead of increasing the height of the bulges 52 in order to accommodate thicker panels, the bellows 48 is able to expand in order to provide an increased and conforming gap between the upper and lower lips 46 and 50, respectively. For these reasons, the upper lip 46 remains visually and functionally acceptable with respect to various different applications.

Figure 9:
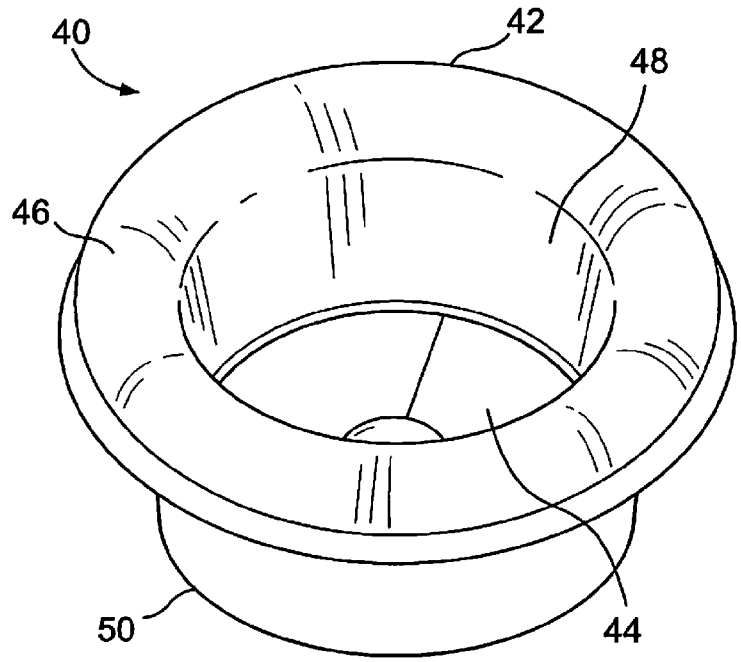
FIG. 9 illustrates an isometric top view of a hole plug in a fully-expanded state, according to an embodiment of the present invention.

FIG. 9 illustrates an isometric top view of the hole plug 40 in a fully-expanded state, according to an embodiment of the present invention. As shown in FIG. 9, the bellows 48 may substantially flatten in order to provide an increased gap between the upper and lower lips 46 and 50, respectively.

Thus, embodiments of the present invention provide a hole plug assembly having an extensible portion, such as a bellows, between upper and lower lips that is configured to expand the gap between the lips in order to accommodate varying panel thicknesses. In contrast to conventional hole plugs, the assembly 40 can accommodate a much wider range of panel thicknesses, such as, for example, on the order of 5 mm. In the past, double-lip hole plug designs were unable to accommodate panels having such a thickness. However, the embodiments of the present invention are configured to be used with such panels.

The assembly 40 may be sized and shaped differently to accommodate any kind of panel. For example, while the assembly 40 is generally shown as circular, the assembly 40 may be shaped as a rectangle, square, triangle, etc.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A hole plug assembly configured to be secured within a hole of a panel, the hole plug assembly comprising:
    a covering base connected to a first lip, wherein said covering base is formed radially about a central axis;
    at least one bellows having a first portion connected to one or both of said covering base or said first lip; and
    a second lip including an arcuate bulge having an outer portion connected to a terminal flange and an inner portion connected to a second portion of said at least one bellows, wherein said at least one bellows is configured to expand and contract over a direction that is parallel to the central axis of said covering base.

2. The hole plug assembly of claim 1, wherein said covering base, said first lip, said at least one bellows, and said second lip are integrally formed together.

3. The hole plug assembly of claim 1, wherein the hole plug assembly is formed of an elastomeric material.

4. The hole plug assembly of claim 1, wherein said first lip radially and outwardly extends from said base.

5. The hole plug assembly of claim 1, wherein said first lip radially and outwardly extends from said base.

6. The hole plug assembly of claim 1, wherein said at least one bellows comprises:
   a flexible ledge that is directed inwardly toward the central axis;
   a curved intermediate portion connected to said flexible ledge; and
   a flap connected between said curved intermediate portion and one of said covering base or a union of said first lip and said covering base.

7. The hole plug assembly of claim 1, wherein said at least one bellows expands and flattens in relation to the direction that is parallel to the central axis when the hole plug assembly is secured within the hole of the panel.

8. A hole plug assembly comprising:
   a covering base connected to a first lip, wherein said covering base is formed radially about a central axis;
   at least one bellows having a first portion connected to one or both of said covering base or said first lip; and
   a second lip including an arcuate bulge having an outer portion connected to a terminal flange and an inner portion connected to a second portion of said at least one bellows, wherein said at least one bellows is configured to expand and contract over a direction that is parallel to the central axis of said covering base,
   wherein said first lip and said second lip are configured to securely fasten to an edge of a panel defining a hole within the panel, and wherein said at least one bellows is configured to allow said first and second lips to securely fasten to panels of increased thicknesses.

9. The hole plug assembly of claim 8, wherein said covering base, said first lip, said at least one bellows, and said second lip are integrally formed together.

10. The hole plug assembly of claim 8, wherein the hole plug assembly is formed of an elastomeric material.

11. The hole plug assembly of claim 8, wherein said at least one bellows comprises:
   a flexible ledge that is directed inwardly toward the central axis;
   a curved intermediate portion connected to said flexible ledge; and
   a flap connected between said curved intermediate portion and one of said covering base or a union of said first lip and said covering base.

12. The hole plug assembly of claim 8, wherein said at least one bellows expands and flattens in relation to the direction that is parallel to the central axis when the hole plug assembly is secured within the hole of the panel.

13. A hole plug assembly formed of a flexible and resilient material, the hole plug assembly comprising:
   a central covering base integrally connected to a first lip, wherein said covering base is formed radially about a central axis, and wherein said first lip radially and outwardly extends from said base;
   at least one bellows having a first portion integrally connected to one or both of said covering base or said first lip; and
   a second lip integrally connected to a second portion of said at least one bellows, wherein said second lip comprises a bulge connected to a flange, wherein said at least bellows is configured to expand and contract over a direction that is parallel to the central axis of said covering base,
   wherein said first lip and said second lip are configured to securely fasten to an edge of a panel defining a hole within the panel, and wherein said at least one bellows is configured to allow said first and second lips to securely fasten to panels of increased thicknesses.

14. The hole plug assembly of claim 13, wherein said at least one bellows comprises:
   a flexible ledge that is directed inwardly toward the central axis;
   a curved intermediate portion connected to said flexible ledge; and
   a flap connected between said curved intermediate portion and said covering base or a union of said first lip and said covering base.

15. The hole plug assembly of claim 13, wherein said at least one bellows expands and flattens in relation to the direction that is parallel to the central axis when the hole plug assembly is secured within the hole of the panel.

* * * * *